Sept. 12, 1933.　　　T. A. GRAVES　　　1,926,095
VALVE
Original Filed March 18, 1929　　2 Sheets-Sheet 1
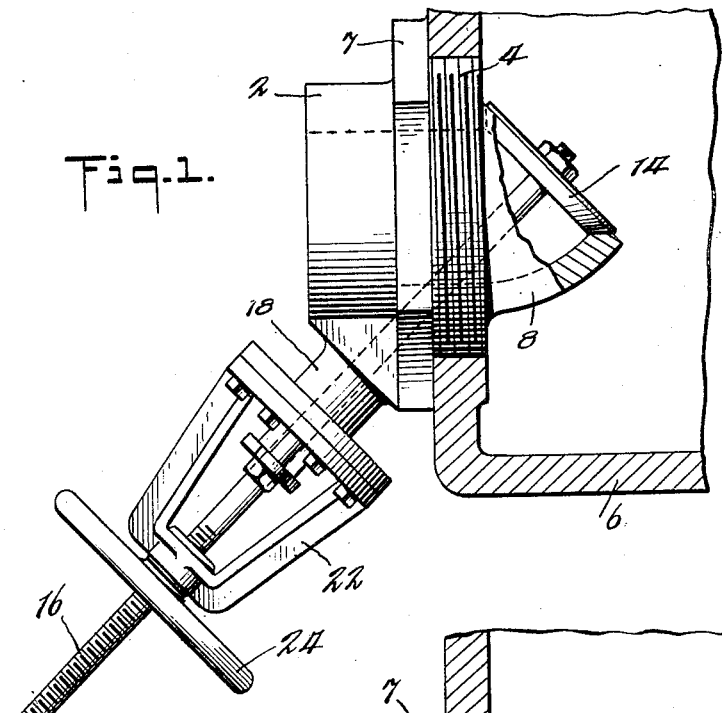
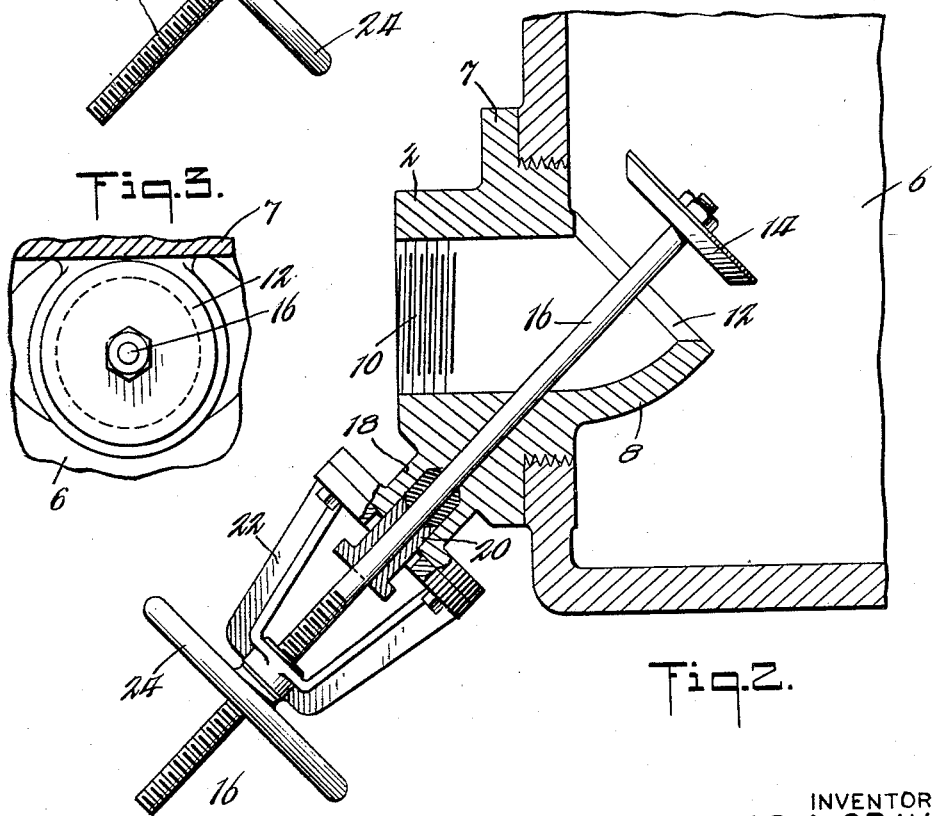
INVENTOR
THOMAS A. GRAVES
BY
ATTORNEYS.

Sept. 12, 1933.    T. A. GRAVES    1,926,095
VALVE
Original Filed March 18, 1929    2 Sheets-Sheet 2
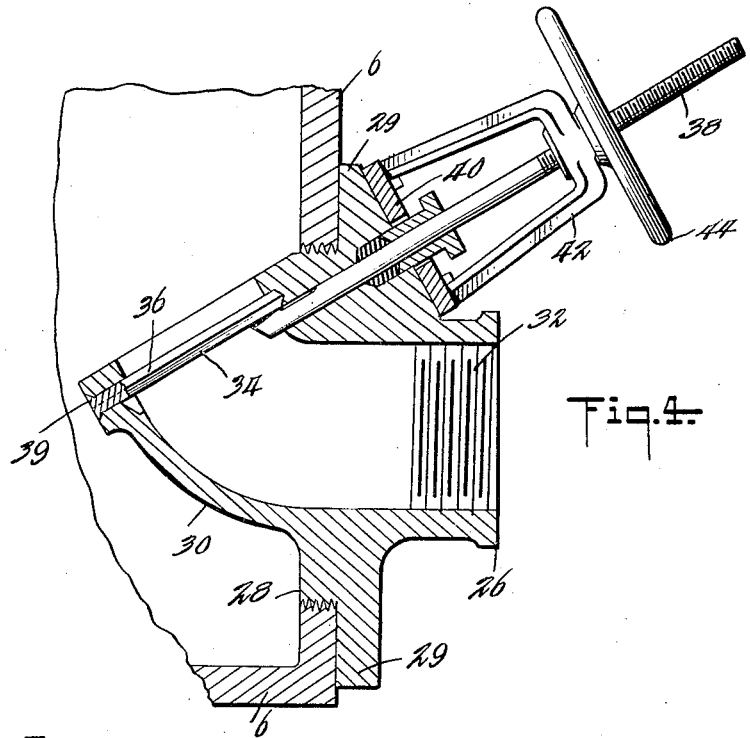
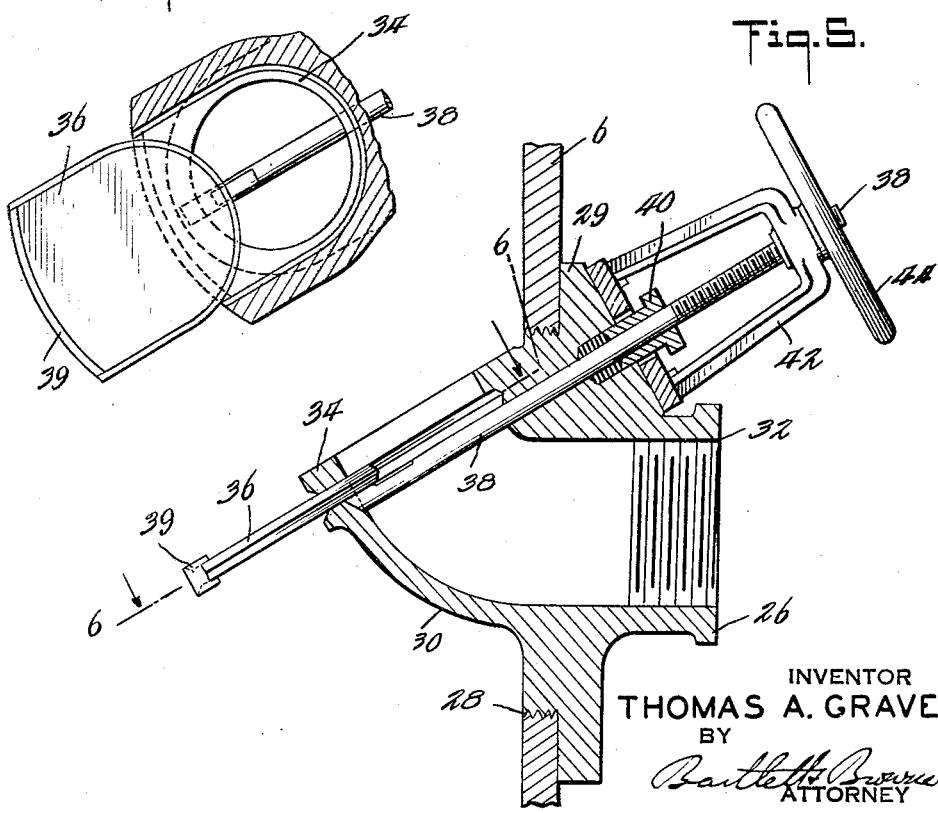
INVENTOR
THOMAS A. GRAVES Patented Sept. 12, 1933

1,926,095

UNITED STATES PATENT OFFICE 1,926,095

VALVE

Thomas Ashley Graves, New Canaan, Conn.

Application March 18, 1929, Serial No. 347,888
Renewed July 21, 1933

5 Claims. (Cl. 137—21)

My invention relates to valves, and has for its object to provide a valve for oil tanks and other liquid containers which is adapted to withstand severe weather conditions in cold climates without freezing, considerable difficulty being experienced in this respect with such valves as heretofore constructed.

A further object of the invention is to provide a valve of the character indicated which is of simple, strong and durable construction and takes up but little space outside of the container to which it may be applied.

These and other objects of the invention and features whereby they may be attained, will be clearly understood from the following description and accompanying drawings, in which:

Figure 1 is a side view, partly in section, of one type of valve embodying features of my invention shown attached to an oil tank or other container, the valve being open;

Fig. 2 is a longitudinal sectional view, partly in elevation with the valve closed;

Fig. 3 is a face view of the valve seat and valve member;

Fig. 4 is a view corresponding to Fig. 1 of another type of valve embodying features of my invention, and showing the valve closed;

Fig. 5 is a similar view but showing the valve open; and

Fig. 6 is a detail sectional view taken on the line 6—6 of Fig. 5.

The globe type of valve illustrated in Figs. 1, 2 and 3 of the drawings, is provided with a casing 2 having a screw-threaded portion 4 that is adapted to be screwed into an outlet opening in an oil tank or other liquid container 6, and a flange 7 for engaging the outer side of the container. The casing is further provided with an inwardly and upwardly curved neck portion 8 through which the valve bore 10 extends, the neck portion being cylindrical in cross section. The outer end of the valve bore is adapted to receive a nozzle or hose. The inner end of the neck portion 8 is provided with an inwardly facing conical valve seat 12 that is arranged in a plane substantially at an angle of 45 degrees to the wall of the container. A valve member 14 is provided which is adapted to be received on the seat 12. This valve member is secured on the inner end of a valve stem 16 which extends through a suitable aperture in the bonnet 18 of the valve, a gland and a gland nut 20 being arranged in the outer end of the aperture to prevent leakage. The outer end portion of the stem extends through a suitable guideway in a yoke 22 secured to the bonnet 18, and a handwheel 24 is screw-threaded on the outer end of the yoke.

With this construction upon turning the hand-wheel, the valve stem may be moved longitudinally in opposite directions to open and close the valve. It will be apparent that the construction is such that upon closing the valve, the curved neck portion causes the liquid at the outside of the valve member to immediately flow or drain away from said member and out of the valve bore so that no liquid remains in the valve to freeze, the only liquid remaining in contact with the valve being that in the container. Consequently, there is no danger of the valve member 14 becoming frozen to its seat, unless of course the body of the liquid within the tank freezes. Another feature of considerable practical importance is the fact that the valve casing takes up but little space outside of the container.

The gate type of valve illustrated in Figs. 4, 5 and 6 is provided with a casing 26 having a screw-threaded portion 28 adapted to be screwed into an outlet opening in the container 6, and a flange 29. The valve casing 26 is further provided with an upwardly curved neck portion 30 projecting into the container and through which the valve bore 32 extends. Near the inner end of the neck portion 30 is a valve seat 34 for receiving a valve member in the form of a gate 36 which is mounted to slide into and out of valve closing position on the seat, the valve gate being moved inwardly with respect to the container to open the valve. The inner portion 39 of the edge of the gate is flared outwardly, the remaining portion of the edge is beveled, and the edge of the seat is correspondingly shaped so as to ensure a tight joint when the valve is closed. The gate is adapted to be moved by means of a valve stem 38 having one end attached to the outer side thereof. The valve stem extends through an aperture in the bonnet of the valve, and to prevent leakage a gland and gland nut 40 surrounds the valve stem and is secured in the outer end of the guiding aperture. The outer portion of the valve stem extends through a suitable guiding collar in a yoke 42 secured to the valve bonnet, and a hand-wheel 44 is screw-threaded on the outer end of the valve stem for moving the stem longitudinally to open and close the valve.

With this construction also, it will be apparent that upon closing the valve, the curved neck portion causes the liquid at the outside of the valve member to immediately flow or drain away from said member and from the valve bore so that no liquid remains in the valve to freeze, the only liquid remaining in contact with the valve being that in the container. This gate type of valve like the other type projects a comparatively slight distance outside of the container to which it is applied.

As will be evident to those skilled in the art, my invention permits various modifications without departing from the spirit thereof or the scope of the appended claims.

What I claim is:

1. A valve of the class described having, in combination, a valve casing adapted to be secured in an aperture in a container and provided with an inwardly projecting portion having a valve seat formed on the inner end portion thereof inclined downwardly and inwardly from said wall of the container, and a valve head adapted to be received on said seat to close the valve and adapted to be moved in a direction inwardly away from said seat to open the valve, said valve head being arranged to slide across said valve seat and means for thus moving said valve head, said casing, valve head and operating means therefor being adapted to be removed as a unit from the container.

2. A valve of the class described having, in combination, a casing adapted to be secured in an aperture in one wall of a container and provided with an inwardly projecting portion having a valve seat formed on the inner end thereof and arranged in a plane at an angle to the horizontal plane of the axis of said aperture, a valve head adapted to be received on said seat to close the valve and adapted to be moved in a direction inwardly to open the valve, said valve head being arranged to slide across said valve seat and means for thus moving the gate to open and close the valve comprising a stem arranged in a plane parallel with the face of said valve head and mounted to slide longitudinally in an aperture in the valve casing, said stem having one end secured to said valve head and its other end extending outside of said casing, and means engaging the outer end of said stem for moving it longiutdinally in opposite directions, said casing, valve head and operating means therefor being adapted to be removed as a unit from the container.

3. A valve of the class described having, in combination, a casing adapted to be secured in an aperture in a container and provided with an outlet aperture having the outer portion thereof arranged substantially at right angles to the adjacent portion of the wall of the container, said casing having an inwardly projecting portion having a valve seat inclined downwardly and inwardly from said wall on the inner end thereof, a valve member adapted to be received on said seat, a valve stem extending through an aperture in a side of the casing, said stem being arranged at right angles to said valve member, and means engaging the outer end of the valve stem for moving the same to open and close the valve, said casing, valve member and valve stem being removable as a unit from the container through said aperture in the container.

4. A valve of the class described having, in combination, a casing adapted to be secured in an aperture in a container and provided with an outlet aperture having its outer portion arranged substantially at right angles to the adjacent portion of the wall of the container, said casing having an inwardly projecting portion provided with a valve seat on its inner end directed upwardly and rearwardly, a valve member adapted to be received on said seat to close the valve and adapted to be moved inwardly to open the valve, a valve stem for thus opening and closing the valve extending through a downwardly and outwardly inclined aperture in a side wall of the casing, and means engaging the outer end portion of said stem for moving the stem to open and close the valve.

5. A valve of the class described having, in combination, a casing having a threaded portion adapted to be screwed into an aperture in a container, having a flange for engaging the outer side of the wall of the container and having an inwardly projecting portion provided with a valve seat angularly arranged with relation to the wall of the container, said casing having an outlet aperture leading outwardly from said valve seat having the outer portion thereof arranged substantially at right angles to the adjacent portion of the wall of the container, a valve member adapted to be received on said seat and moved away from said seat to respectively open and close the valve, a valve stem extending through an aperture in the side of said casing, and means engaging the outer end portion of said stem for moving the stem longitudinally to open and close the valve.

THOMAS ASHLEY GRAVES.